United States Patent [19]

Kim

[11] 3,748,084

[45] July 24, 1973

[54] PHOTO-FLASH FIRING CIRCUIT EMPLOYING PARALLEL RESISTOR-DIODE COMBINATIONS

[75] Inventor: Sang-Chul Kim, Cleveland Heights, Ohio

[73] Assignee: General Electric Company, Schenectady, N.Y.

[22] Filed: Sept. 28, 1971

[21] Appl. No.: 184,445

[52] U.S. Cl. .......... 431/95
[51] Int. Cl. .......... F21k 5/02
[58] Field of Search .......... 307/317; 431/93–95, 95 A, 98; 240/1.3

[56] References Cited

UNITED STATES PATENTS

| | | | |
|---|---|---|---|
| 3,079,571 | 2/1963 | Elliott et al. | 307/317 X |
| 2,874,558 | 2/1959 | Mizui | 240/1.3 X |
| 3,518,487 | 6/1970 | Masashi-Tanaka et al. | 431/95 X |
| 3,532,931 | 10/1970 | Cote et al. | 431/95 R |
| 3,668,468 | 6/1972 | Kornrompf et al. | 431/95 R |
| 3,676,045 | 7/1972 | Watrous et al. | 431/95 R |
| 3,676,046 | 7/1972 | Laskowski | 431/95 R |

OTHER PUBLICATIONS

"Industrial Photography", July 1961, pages 15, 52.

*Primary Examiner*—Carroll B. Dority, Jr.
*Attorney*—Norman C. Fulmer et al.

[57] ABSTRACT

A plurality of parallel resistor-diode combinations are successively connected in series between a plurality of photoflash lamps, so as to connect the flash lamps into an electrical parallel circuit through the resistor-diode combinations. An end of the parallel circuit is adapted to be connected across a source of firing pulses. Each successive firing pulse will flash a different lamp. In a further embodiment, additional resistors are connected between the aforesaid end of the circuit and the respective resistor-diode combinations.

11 Claims, 3 Drawing Figures

Inventor:
Sang-Chul Kim
by Norman C. Fulmer
His Attorney

PHOTO-FLASH FIRING CIRCUIT EMPLOYING PARALLEL RESISTOR-DIODE COMBINATIONS

CROSS-REFERENCES TO RELATED APPLICATIONS

Ser. No. 29,547, filed Apr. 17, 1970, Edward J. Laskowski, "DIODE CIRCUIT FOR SEQUENTIALLY FLASHING PHOTOFLASH LAMPS", now U.S. Pat. No. 3,694,696.

Ser. No. 39,418, filed May 21, 1970, Sang-Chul Kim, "RESISTOR CIRCUIT FOR SEQUENTIALLY FLASHING PHOTOFLASH LAMPS", now U.S. Pat. No. 3,619,715.

Ser. No. 184,463, filed concurrently herewith, Sang-Chul Kim, "PHOTOFLASH FIRING CIRCUITS EMPLOYING SERIES RESISTOR-DIODE COMBINATIONS", all of the foregoing applications being assigned to the same assignee as the present patent application.

BACKGROUND OF THE INVENTION

The invention is in the field of electronic circuitry for sequentially flashing photoflash lamps, and is particularly useful with a unitary array of flash lamps, such as three or four or more lamps arranged to radiate their light in the same direction when they are sequentially flashed, so that the array need not be moved nor removed until all of its lamps have been flashed.

Numerous circuits have been devised for sequentially flashing photoflash lamps by pulses of electrical energy such as are obtained from a battery through a momentarily closed switch or from a capacitor which has been charged through a resistor from a battery, or from some other suitable energy source. Such a pulse of electrical energy usually is initiated by closure of a switch associated with the shutter mechanism of a camera. A type of circuit heretofore proposed employs mechanically actuated switches for applying the electrical pulses to successively different flashbulbs; another type of circuit utilizes heat-responsive or light-responsive means associated with the flash lamps and adapted to actuate switching means for connecting the pulse source to successively different flash lamps as each lamp becomes flashed; and a further type of circuit utilizes transistors or thyristors for automatically connecting the pulse source to successively different flash lamps as each lamp becomes flashed.

Another previously proposed circuit employs resistors successively connected in series with a plurality of individual flash lamps, so that the lamps are connected in electrical parallel through the resistors. The firing pulse source is connected to an end of the circuit, whereby each flash lamp is connected across the pulse source through successively greater resistance. The first pulse flashes the nearest lamp, which becomes an open circuit upon flashing, whereupon the next pulse flashes the next lamp, etc. It is difficult, however, to select resistance values of the series resistors such that the circuit will flash the first lamp without also undesirably flashing the next lamp, while also insuring that, when all lamps but the last have been flashed, the circuit will apply enough of the firing pulse energy through the series resistors to reliably cause the last lamp to flash.

The above-referenced Laskowski patent application discloses a circuit in which diodes are successively connected in series between photoflash lamps. The above-referenced Kim patent application Ser. No. 39,418 discloses a circuit having resistors successively connected in series between photoflash lamps, and additional resistors connected between points of at least some of the series resistors. The above-referenced Kim concurrently filed patent application discloses a circuit having series-connected resistor-diode combinations connected successively in series between photoflash lamps.

SUMMARY OF THE INVENTION

Objects of the invention are to provide an improved circuit for sequentially flashing flash lamps, and to provide such a circuit that it is low in cost and highly reliable in operation.

The invention comprises, briefly and in a preferred embodiment, a plurality of photoflash lamps intended to be sequentially flashed by a sequential series of firing voltage pulses, a plurality of parallel resistor-diode combinations successively connected between the lamps so as to connect the lamps into an electrical parallel circuit through the resistor-diode combinations, and means adapted for connecting an end of the parallel circuit across a source of firing pulses. In a further embodiment, one or more additional resistors are connected between said end of the parallel circuit and at least some of the respective resistor-diode combinations. The diodes in the circuit are connected so as to be forward-biased by the polarity of the firing pulses. In one embodiment the additional resistors are connected to taps on the resistors of the parallel resistor-diode combinations, and in another embodiment the additional resistors are connected to junctions of stacked diode elements in the parallel resistor-diode combinations.

BRIEF DESCRIPTION OF THE DRAIWNG

DESCRIPTION OF THE PREFERRED EMBODIMENT

Figure 1:
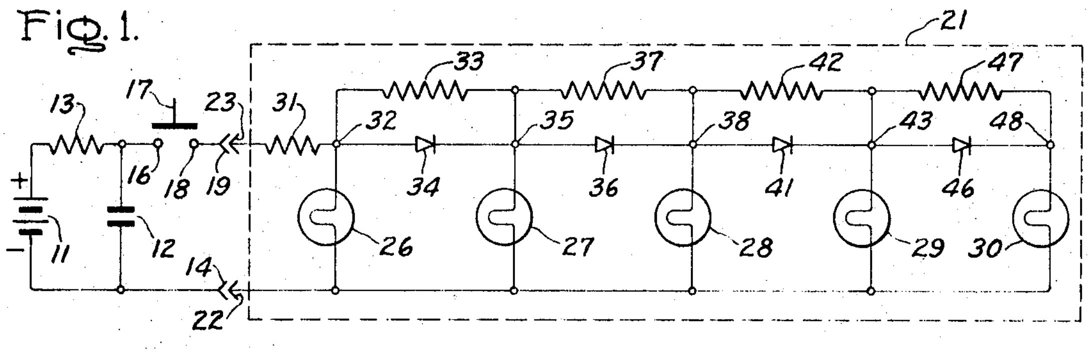
FIG. 1 is an electrical schematic diagram of a preferred embodiment of the invention.

In the circuit of FIG. 1, a battery 11 is connected to charge a capacitor 12 through a resistor 13. In a preferred arrangement, the battery 11 has a voltage of 9 volts, the capacitor 12 has a capacitance of 1,000 microfarads, and the resistor 13 has a resistance of 1,000 ohms. One terminal of the capacitor 12 is connected to a connector plug terminal 14, and the other terminal of capacitor 12 is connected to a terminal 16 of a switch 17, the other terminal 18 thereof being connected to a connector plug terminal 19. The switch 17 is adapted to be momentarily closed in synchronization with the opening of a camera shutter, in well known manner. The circuitry thus far described functions as a source of electrical energy pulses for flashing photoflash lamps, and may be incorporated in a camera, or in a flash attachment for use with a camera. Although the firing pulse is sometimes called a "voltage" pulse, it is primarily the energy of the pulse, comprising the combination of voltage, current, and time duration, that causes a lamp to flash.

A flash lamp array unit 21 is provided with a pair of connector prongs 22 and 23 adapted for electrical engagement with the terminals 14 and 19, respectively. The unit 21 contains a plurality of photoflash lamps 26–30 which may be of conventional type such as General Electric type AG-1, each containing a filament provided with electrical connection lead wires and adapted for initiating a flash of combustible material contained within the bulb. One end of the filament of each of the lamps 26-30 is connected to the connector prong 22. The other ends of the filaments of lamps 26–30 are successively connected, through an arrangement of resistors and diodes, to the connector prong 23. More specifically, a resistor 31 is connected between the connector prong 23 and the lead wire terminal 32 of lamp 26, a resistor 33 and a diode 34 are connected in parallel between the first lamp lead wire terminal 32 and the lead wire terminal 35 of lamp 27, a diode 36 and a resistor 37 are connected in parallel between the lead wire terminal 35 of lamp 27 and lead wire terminal 38 of lamp 28, a diode 41 and a resistor 42 are connected in parallel between the lead wire terminal 38 and lead wire terminal 43 of lamp 29, and a diode 46 and a resistor 47 are connected in parallel between the lead wire terminal 43 and the lead wire terminal 48 of lamp 30. Each of the diodes 34, 36, 41 and 46 is connected in the circuit so as to be forward biased by the polarity of firing pulses provided by the charge on the capacitor 12. Thus, parallel resistor-diode combinations are successively connected between the flash lamps.

Preferably the lamps 26–30 of the array 21 are provided with individual reflectors arranged to radiate the light emitted therefrom in the same direction. If desired, another combination of lamps and resistor-diode parallel circuits may be provided in the unit 21, for radiating the light emission in the opposite direction, so that when all of the lamps at the front of the unit have been flashed, the unit may be turned around so that the rear array of lamps will then face frontwardly, for obtaining an additional number of flashes from the single unit. Other connector prongs similar to 22 and 23 can be provided for connecting the rear array of lamp circuitry to the connectors 14 and 19 when the unit is turned around for flashing the second array of lamps. If desired, the flash array unit 21 may be removed from the camera or flash adaptor after some of its lamps have been flashed, and reinserted at a later time for flashing the remaining lamps. After the lamps have been flashed, the array unit 21 may be discarded.

The circuit of FIG. 1 functions as follows. Upon a momentary closing of the switch 17, in synchronization with the opening of a camera shutter, the electrical energy stored in the capacitor 12 (40 millijoules for a 1,000 microfarad capacitor charged to 9 volts) discharges into the circuit of the lamp unit 21, in the form of an electrical pulse having an approximately exponential decay characteristic. Most of the capacitor's electrical energy discharges through the filament of the first lamp 26, and a portion of the pulse energy current flows through the filaments of the remaining lamps 27–30 via the parallel connected resistors and diodes. All of the aforesaid currents flow through a return path provided via the connectors 14 and 22.

While the major portion of electrical energy of the firing pulse from capacitor 12 is flowing through the filament of the first lamp 26, the filament resistance (which initially is about 0.6 ohms for a typical flash lamp) increases as the filament becomes incandescent, and the filament burns out and becomes an open circuit as the lamp flashes. The moment at which the lamp 26 flashes and its filament becomes an open circuit, is a critical moment at which the next lamp 27 is most likely to undesirably flash, because when the filament of lamp 26 becomes an open circuit the remaining energy in capacitor 12 is available to flow through filaments of the remaining lamps. However, at this moment the energy remaining in capacitor 12 has been reduced, due to the pulse energy used in flashing the first lamp 26 and also due to portions of the firing pulse energy being drained off through the remaining circuitry as described above, to a value such that the remaining voltage is low enough so that the forward resistance of the diode 34 has increased to a value such as to provide a voltage divider in combination with the filament resistance of lamp 27, thus limiting the current flow in lamp 27; the excess pulse energy drains off through the series circuit of resistors 33, 37, 42 and 47 and the remaining lamp filaments. Thus, the second lamp 27 is prevented from undesirably flashing when the first lamp 26 is flashed.

Upon the next momentary closing of the switch 17, in synchronization with the opening of the camera shutter, the diode 34 is rendered conductive and most of the electrical pulse energy from capacitor 12 flows through the filament of the second flash lamp 27, since the first lamp 26 now is an open circuit. The energy discharged through the lamp 27 is reduced slightly by the voltage drops across the resistor 31 and the parallel resistor-diode combination 33–34, and also is reduced somewhat by portions of the pulse energy flowig through the remainder of the circuit as has been described above in connection with firing of the first lamp 26; however, the major portion of the firing pulse energy which flows through the second lamp 27 is adequate for causing the lamp to reliably flash. The foregoing procedure is repeated until all of the lamps have been flashed.

The circuit advantageously supplies approximately equal firing pulse energies to each of the lamps when flashed, this amount of firing pulse energy being considerably higher than the amount or portions of pulse energy simultaneously applied to the remaining unflashed lamps in the cirucit. This is achieved by the fact that the initial voltage of the firing pulse (9 volts, for example) is adequate to render conductive all of the diodes preceding the nearest unflashed lamp. More specifically, when the second firing pulse occurs, the diode 34 quickly becomes conductive and has a voltage drop of approximately 0.6 volts, thus applying substantially the full voltage and energy of the firing pulse to the second lamp 27. When the fifth firing pulse occurs, the four diodes 34, 36, 41 and 46 quickly become conductive and have a total voltage drop of approximately 2.4 volts, thus applying ample firing pulse voltage and energy to the fifth lamp 30 for causing it to flash.

From the foregoing, it is seen that the resistors of the parallel resistor-diode combinations perform the useful function of draining off some of the firing pulse energy when each of the earlier lamps are flashed, so that at the instant when the lamp flashes and becomes an open circuit there will be insufficient remaining firing pulse energy to render the next diode conductive and cause undesirable flashing of the next lamp. The diodes of the parallel resistor-diode combinations perform the useful function of providing a low voltage-drop path for applying the firing pulses to the second and succeeding lamps when they are flashed. The beneficial result, as pointed out above, is the application of approximately equal firing pulse energies to each of the lamps when flashed, and a considerably lesser amount of the firing pulse energy to the remaining unflashed lamps.

The first series resistor 31 in the circuit helps to reduce the firing pulse energy applied to the first lamp 26, thus reducing the likelihood of the second lamp 27 undesirably flashing when the first lamp is flashed, but can be omitted if desired.

Figure 2:
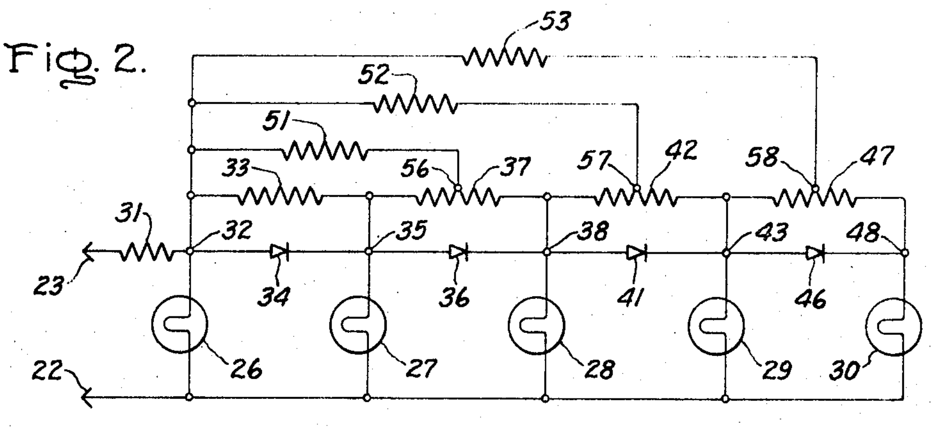
FIG. 2 is an electrical schematic diagram of an alternative embodiment of the invention, employing additional resistors connected to taps on the resistors of the parallel resistor-diode combinations.

In FIG. 2 the flash array circuit is the same as in FIG. 1, except that additional resistors 51, 52 and 53 are connected between the first lead wire terminal 32 and, respectively, points 56, 57, 58 of the resistors 37, 42 and 47. These additional resistors function to provide more drain-off of firing pulse energy when the earlier lamps are being flashed, and also distribute the drain-off pulse energy more equally through the remaining unflashed lamps, thus further insuring that only a single lamp will be flahsed by each firing pulse.

Figure 3:
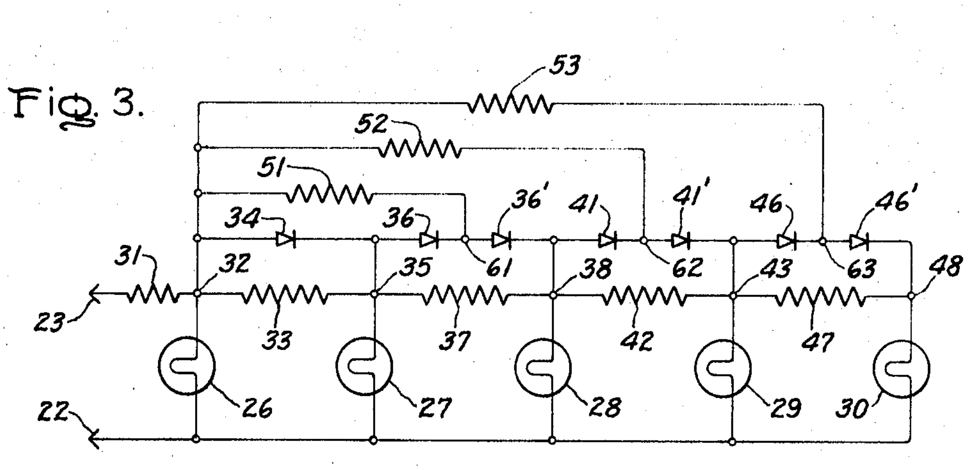
FIG. 3 is an electrical schematic diagram of an alternative embodiment in which additional resistors are connected to junctions of stacked diodes in the parallel resistor-diode combinations.

FIG. 3 is similar to FIG. 2, except that the ends of the additional resistors 51, 52 and 53 are connected to the diodes instead of to the resistors of the parallel resistor-diode combinations. This is accomplished by providing stacked diodes. The second parallel resistor-diode combiantion is provided with two stacked diode elements 36 and 36′, the additional resistor 51 bieng connected to the junction 61 of these diode elements. Similarly, the additional resistors 52 and 53 are connected to functions 62 and 63 of stacked diodes 41, 41′ and 46, 46′. The circuit functions similar to that of FIG. 3, except that the drain-off pulse currents when the earlier lamps are flashed are blocked (by diodes 36, 41 and 46) from flowing backwardly through earlier lamps and hence flow only through the later lamps from points 61, 62 and 63, thus achieving more equal distribution of the pulse drain-off energy through the remaining unflashed lamps, in certain circuit designs. The extra diodes in this embodiment do not add much cost to the circuit if all of the diodes are manufactured simultaneously on a single semiconductor chip by integrated circuit techniques.

The circuits shown in the drawing may comprise General Electric type AG-1 flash lamps, which have a cold filament resistance of about 0.6 ohms; each of the diodes may be a General Electric silicon diode type 1N5060; resistor 31 may have a value of 3.5 ohms; each of the resistors 33, 37, 42 and 47 may have a value of 2.0 ohms, and the additional resistors 51, 52 and 53 may respectively have values of 16, 3 and 23 ohms. Although the parallel resistor-diode combinations are shown in the "upper" branch of the circuit, some or all of them may be connected in the "lower" branch.

The circuitry of the invention can be incorporated into a camera or flash adaptor instead of in a disposable flash array, with the requisite number of electrical connectors being provided for connecting the filament lead wire terminals 32, 35, etc., of the array respectively to the different connection terminal points of the circuit.

While a preferred embodiment of the invention, and modifications thereof, have been shown and described, other embodiments and modifications thereof will become apparent to persons skilled in the art, and will fall within the scope of invention as defined in the following claims.

What I claim as new and desire to secure by Letters Patent of the United States is:

1. A circuit for causing a plurality of photoflash lamps to be flashed sequentially by sequential firing energy pulses of given electrical polarity, said circuit comprising a plurality of pairs of terminal points adapted for electrical connection thereto of respective individual lamps of said plurality of flash lamps, and connection means successively connected between said pairs of terminal points to connect said pairs of terminal points into an electrical parallel circuit through said connection means, a first pair of said terminal points at one end of said parallel circuit being adapted for connection to a source of said firing pulses, wherein the improvement comprises a plurality of parallel resistor-diode combinations respectively constituting at least some of said connection means, said diodes being connected in the circuit so as to be forward-biased by said given polarity of the firing pulses.

2. A circuit as claimed in claim 1, including an additional resistor connected between a terminal point at said one end of the circuit and one of said parallel resistor-diode combinations.

3. A circuit as claimed in claim 2, in which said additional resistor is connected to the parallel resistor-diode combination at a point of the resistor thereof.

4. A circuit as claimed in claim 2, in which the diode of said one parallel resistor-diode combination comprises a plurality of stacked diode elements, said additional resistor being connected to a junction between said diode elements.

5. A circuit as claimed in claim 1, including a plurality of additional resistors connected between a terminal point at said one end of the circuit and respectively different ones of said parallel resistor-diode combinations.

6. A circuit as claimed in claim 5, in which said additional resistors are connected to points of resistors in respectively different parallel resistor-diode combinations.

7. A circuit as claimed in claim 5, in which the diode of each parallel resistor-diode combination to which an additional resistor is connected comprises a plurality of stacked diode elements, said additional resistors being respectively connected to junctions between diode elements of respectively different parallel resistor-diode combinations.

8. A disposable unitary array of photoflash lamps including circuitry for causing said lamps to be flashed sequentially by sequential firing energy pulses of given electrical polarity, each of said lamps containing a filament for initiating flashing of the lamp and adapted to become an open circuit when said flashing occurs, connection means successively connected between said filaments of the lamps to connect said filaments into an electrical parallel circuit through said connection means, and means adapted to connect a first lamp filament at one end of said parallel circuit to a source of said firing pulses, wherein the improvement comprises a plurality of parallel resistor-diode combinations respectively constituting at least some of said connection means, said diodes being connected in the circuit so as to be forward-biased by said given polarity of the firing pulses.

9. An array as claimed in claim 8, including a plurality of additional resistors connected between said first lamp filament and respectively different ones of said parallel resistor-diode combinations.

10. An array as claimed in claim 9, in which said additional resistors are connected to points of resistors in respectively different parallel resistor-diode combinations.

11. An array as claimed in claim 9, in which the diode of each parallel resistor-diode combination to which an additional resistor is connected comprises a plurality of stacked diode elements, said additional resistors being respectively connected to junctions between diode elements of respectively different parallel resistor-diode combinations.

* * * * *